(12) United States Patent
Goodman et al.

(10) Patent No.: US 9,043,050 B2
(45) Date of Patent: May 26, 2015

(54) PROGRAMMABLE REVERSE THRUST DETENT SYSTEM AND METHOD

(75) Inventors: William L. Goodman, Coupeville, WA (US); Thomas Imrich, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 1697 days.

(21) Appl. No.: 12/191,197

(22) Filed: Aug. 13, 2008

(65) Prior Publication Data

US 2010/0042267 A1  Feb. 18, 2010

(51) Int. Cl.
| | |
|---|---|
| G01C 23/00 | (2006.01) |
| F02K 1/76 | (2006.01) |
| B64D 31/04 | (2006.01) |
| G05D 1/00 | (2006.01) |

(52) U.S. Cl.
CPC . *F02K 1/76* (2013.01); *B64D 31/04* (2013.01); *G05D 1/0083* (2013.01)

(58) Field of Classification Search
CPC .................................. B64C 13/04; B64D 31/04
See application file for complete search history.

(56) References Cited

U.S. PATENT DOCUMENTS

| | | | | |
|---|---|---|---|---|
| 3,618,880 A | * | 11/1971 | Hagaman et al. | 244/113 |
| 4,401,077 A | * | 8/1983 | Earl | 123/376 |
| 4,513,235 A | * | 4/1985 | Acklam et al. | 318/685 |
| 4,958,289 A | * | 9/1990 | Sum et al. | 701/99 |
| 5,029,778 A | * | 7/1991 | DeLuca | 244/234 |
| 5,039,037 A | * | 8/1991 | DeLuca | 244/234 |
| 5,960,626 A | * | 10/1999 | Baudu et al. | 60/226.2 |
| 5,968,106 A | * | 10/1999 | DeVlieg et al. | 701/70 |
| 5,984,234 A | * | 11/1999 | Brouwer et al. | 244/129.5 |
| 6,151,883 A | * | 11/2000 | Hatrick et al. | 60/226.2 |
| 6,704,630 B2 | * | 3/2004 | Ostrom et al. | 701/29.2 |
| 6,886,786 B1 | * | 5/2005 | Huynh | 244/182 |
| 6,928,363 B2 | * | 8/2005 | Sankrithi | 701/120 |
| 6,991,303 B2 | | 1/2006 | Woll | |
| 7,143,984 B2 | * | 12/2006 | Marjanski | 244/234 |
| 7,797,095 B2 | * | 9/2010 | Rado | 701/80 |
| 7,818,100 B2 | * | 10/2010 | Goodman et al. | 701/16 |
| 2003/0191565 A1 | * | 10/2003 | Ostrom et al. | 701/29 |
| 2004/0059497 A1 | * | 3/2004 | Sankrithi | 701/120 |
| 2005/0006524 A1 | * | 1/2005 | Villaume et al. | 244/111 |
| 2005/0236525 A1 | * | 10/2005 | Marjanski | 244/234 |
| 2007/0208466 A1 | * | 9/2007 | Meunier | 701/16 |

(Continued)

FOREIGN PATENT DOCUMENTS

GB  1450076 A  9/1976

OTHER PUBLICATIONS

U.S. Appl. No. 11/777,351, Goodman, filed Jul. 13, 2007.

*Primary Examiner* — Jonathan L Sample
(74) *Attorney, Agent, or Firm* — Parsons Behle & Latimer (57) ABSTRACT

A reverse thrust detent system for an aircraft includes a throttle quadrant having an intermediate reverse thrust detent position, a reverse thrust scheduling system interfacing with the throttle quadrant, at least one aircraft engine interfacing with the reverse thrust scheduling system and a programmable input interfacing with the reverse thrust scheduling system and adapted to receive an engine reverse thrust setting. The reverse thrust scheduling system is adapted to operate the at least one aircraft engine according to the engine reverse thrust setting responsive to actuation of the intermediate reverse thrust detent position of the throttle quadrant. A reverse thrust detent method for an aircraft is also disclosed.

21 Claims, 4 Drawing Sheets

(56) References Cited

U.S. PATENT DOCUMENTS

| | | |
|---|---|---|
| 2008/0071432 A1* | 3/2008 | DeVlieg et al. .................. 701/3 |
| 2008/0154470 A1* | 6/2008 | Goranson et al. ............... 701/70 |
| 2008/0249675 A1* | 10/2008 | Goodman et al. .............. 701/16 |
| 2009/0018713 A1* | 1/2009 | Coulmeau et al. ................ 701/3 |
| 2009/0045982 A1* | 2/2009 | Caillaud et al. ............... 340/972 |
| 2009/0320445 A1* | 12/2009 | Dupre ............................. 60/228 |
| 2010/0042267 A1* | 2/2010 | Goodman et al. ................ 701/3 |

* cited by examiner

PROGRAMMABLE REVERSE THRUST DETENT SYSTEM AND METHOD

CROSS-REFERENCES TO RELATED APPLICATIONS

This application is related to and hereby incorporates by reference in its entirety application Ser. No. 11/777,351, entitled "System and Method for Optimized Runway Exiting".

TECHNICAL FIELD OF THE INVENTION

The disclosure generally relates to aircraft braking techniques. More particularly, the disclosure relates to a programmable reverse thrust detent system and method for the optimization of landing runway deceleration and exiting of an aircraft.

BACKGROUND OF THE INVENTION

Conventional aircraft AUTOBRAKE systems may control airplane deceleration to one of several predetermined aircraft deceleration settings. Thus, if a pilot wishes to stop the airplane at a certain point on the runway, for example at a runway exit, it may be unlikely that the AUTOBRAKE system would provide a deceleration setting that matches the stopping distance to the selected runway stop point. The pilot's choice may be to select one of the deceleration settings, and, if the airplane decelerates too quickly, the pilot may select another AUTOBRAKE setting or disarm the AUTOBRAKE system and use pedal braking to avoid stopping short of the desired point. If, however, the airplane decelerates too slowly, the pilot may again need to revert to a different AUTOBRAKE setting or to pedal braking to increase deceleration to stop the airplane at the selected stopping point. Both of the above conditions may result in uneven deceleration that may be apparent to the airplane passengers.

Aircraft AUTOBRAKING systems have been developed which apply predetermined braking to an aircraft. These AUTOBRAKING systems may provide four or five selectable deceleration rates which can be used to decelerate the landing aircraft at the deceleration rate selected by the pilot. The result may be either the braking of the aircraft at a specific rate until stopped or the pilot taking command of braking before the aircraft stops.

Modern aircraft may have the ability to determine aircraft position on the runway, calculate the deceleration rate of the aircraft for a specific exit taxiway on that runway, and automatically modulate the application of the aircraft brakes such that the aircraft arrives at the exit taxiway at a speed slow enough as to exit at the predefined exit taxiway. An optimum runway exiting (ORE) system currently in use may enable pilots to specify target landing runway taxiway exits for vacating landing runways and provides predicted landing performance targets. Currently, this predicted landing performance may be based on use of either the MAX Reverse setting or the IDLE Reverse setting on the reverse thrust system of the engines. These may be the only two reverse thrust detent positions which are available for braking of the aircraft upon landing and for which landing performance data can be produced. In some applications, however, use of only the MAX Reverse setting or the IDLE Reverse setting may provide insufficient landing performance resolution or non-optimum performance.

SUMMARY OF THE INVENTION

The disclosure is generally directed to providing a variable reverse thrust detent system for an aircraft. An illustrative embodiment of the reverse thrust detent system includes a throttle quadrant having an adjustable intermediate reverse thrust detent position for each intended reverse thrust system use, a reverse thrust scheduling system interfacing with the throttle quadrant, at least one aircraft engine interfacing with the reverse thrust scheduling system and a programmable input interfacing with the reverse thrust scheduling system and adapted to receive an engine reverse thrust setting. The reverse thrust scheduling system is adapted to operate the at least one aircraft engine according to the engine reverse thrust setting responsive to actuation of the intermediate reverse thrust detent position of the throttle quadrant.

The disclosure is further generally directed to a reverse thrust detent method for an aircraft having at least one aircraft engine. An illustrative embodiment of the reverse thrust detent method includes providing a throttle quadrant for the aircraft, providing programmable and adjustable intermediate reverse thrust detent position on the throttle quadrant, defining a range of possible engine reverse thrust detent settings when using an intermediate level of reverse thrust detent position, selecting an optimum engine reverse thrust setting corresponding to that needed to precisely decelerate a position abeam an intended landing runway taxiway exit, setting the throttle quadrant to an optimum intermediate reverse thrust detent position for each intended use and operating the at least one aircraft engine according to the optimum engine reverse thrust setting for that landing, which aids the aircraft to decelerate to a safe taxi speed at a position abeam the intended landing runway taxiway exit.

BRIEF DESCRIPTION OF THE ILLUSTRATIONS

Various embodiments will hereinafter be described in conjunction with the following drawing figures, wherein like numerals denote like elements.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

The present disclosure is generally directed to a programmable reverse thrust detent system for an aircraft. The programmable reverse thrust detent system may facilitate deceleration of an aircraft after landing to a desired velocity at a pre-selected exit taxiway (ET) or other location on a landing runway by implementing a reverse thrust of the aircraft engines. In some applications, the programmable reverse thrust detent system may operate in conjunction with an optimized runway exiting (ORE) system such as that which is disclosed in application Ser. No. 11/777,351 and entitled "System and Method for Optimized Runway Exiting", which is incorporated by reference herein. The programmable reverse thrust detent system may be provided on a throttle quadrant of an aircraft and enable a pilot or flight crew to implement reverse engine thrust of a predictable and predetermined magnitude upon landing of the aircraft such that the aircraft can optimally decelerate at a substantially uniform rate to a desired velocity at a pre-selected one of multiple exit taxiways or other locations spaced along a landing runway. The programmable reverse thrust detent system, alone or in combination with the ORE system, may allow a pilot or flight crew to select a desired landing runway and a desired exit taxiway (ET) or other location on the desired landing runway prior to landing, and then, after landing, consistently slow or decelerate the aircraft to an appropriate taxi speed at the appropriate location on the desired landing runway so that the aircraft can exit the runway at the desired exit taxiway (ET) or other location. Upon landing of the aircraft, positioning of the throttle control lever to the programmable reverse thrust detent position of the throttle quadrant may implement reverse thrust of a predictable and pre-programmed magnitude from the aircraft's engines, resulting in an optimum post-landing slowing or deceleration rate of the aircraft on a landing runway and enabling the aircraft to reach a pre-selected landing runway exit taxiway or other location at a desired velocity. Such optimization may reduce the need for the use of MAX reverse thrust of the engines after landing, allowing for more rapid engine temperature stabilization (sooner engine shutdown for single-engine taxi and associated fuel savings) as well as reduced engine wear and associated costs. Furthermore, use of the programmable reverse thrust detent position may improve runway exiting techniques and help increase runway throughput.

In some applications, the programmable reverse thrust detent system may be operated without the use of an automatic braking system to allow a pilot or flight crew to decelerate a landed aircraft to a selected velocity at an exit taxiway (ET) or other predetermined position on a particular landing runway. In other applications, the automatic braking system of the aircraft may be applied as the magnitude of reverse thrust from the aircraft's engines is controlled in such a manner that the aircraft reaches the selected velocity at the ET or other predetermined position on the landing runway. The reverse thrust detent position in the throttle quadrant may be located by tactile feedback.

Figure 1:
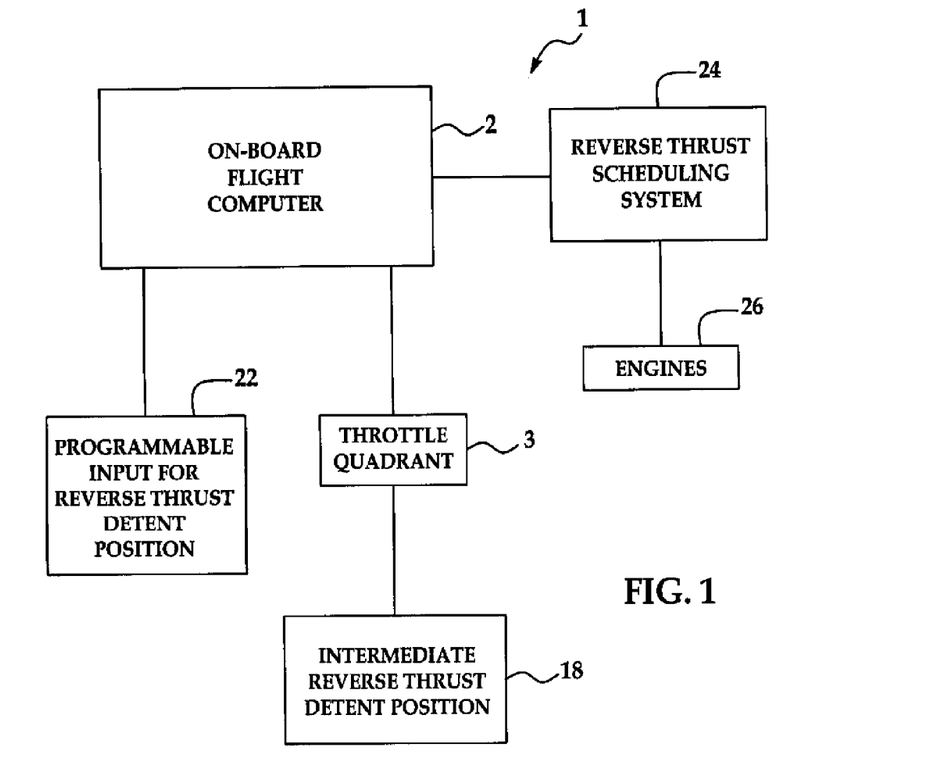
FIG. 1 is a schematic block diagram of an illustrative embodiment of a reverse thrust detent system.
Figure 2:
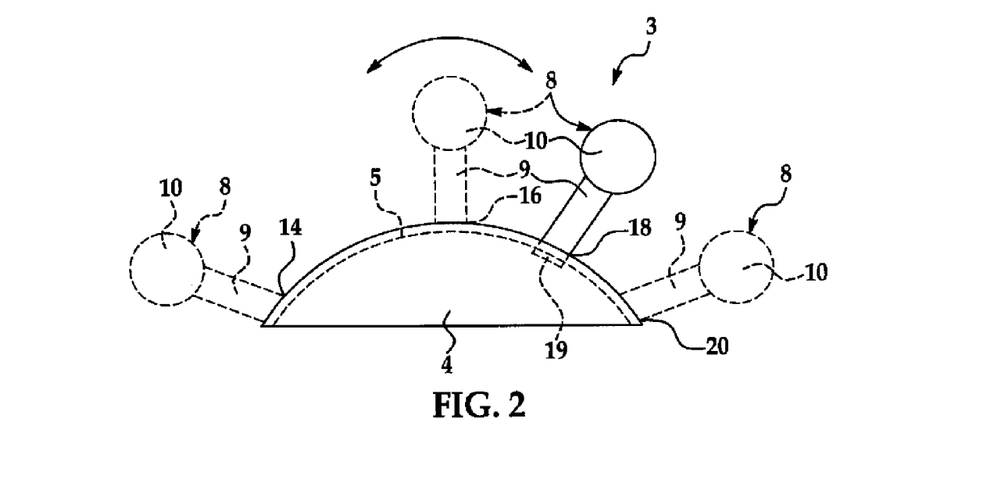
FIG. 2 is side view of a throttle quadrant fitted with an intermediate reverse thrust detent position (shown in solid lines) suitable for implementation of an illustrative embodiment of the reverse thrust detent system.

Referring initially to FIGS. 1 and 2, an illustrative embodiment of the programmable reverse thrust detent system is generally indicated by reference numeral 1 in FIG. 1. The programmable reverse thrust detent system 1 may include an onboard flight computer 2. The onboard flight computer 2 may include various components (not shown) such as a processing unit which implements a flight management system and an aircraft information management system, an instrumentation interface, a user input interface, a communication network interface, a memory interface and a system memory, for example and without limitation. The various modules in the onboard flight computer 2 may communicate with one another over a system data bus (not shown). The onboard flight computer 2 may also be adapted to implement the various functions of the programmable reverse thrust detent system 1, which will be hereinafter described.

A throttle quadrant 3 may interface with the onboard flight computer 2. The throttle quadrant 3 may have an intermediate reverse thrust detent position 18 which will be hereinafter described. A reverse thrust scheduling system 24 may interface with the throttle quadrant 3 such as through the onboard computer 2, for example. Aircraft engines 26 of the aircraft (not shown) in which the programmable reverse thrust detent system 1 is implemented may interface with the reverse thrust scheduling system 24. A programmable input for the reverse thrust detent position 22 may interface with the onboard flight computer 2.

As shown in FIG. 2, the throttle quadrant 3 may include a base 4 which may be located on a center console (not shown) or other location in a cockpit of an aircraft. At least one lever slot 5 may be provided in the base 4. At least one throttle control lever B may include a lever shaft 9 which is slidably disposed in a corresponding lever slot 5. A lever handle 10 may be provided on the lever shaft 9. The lever shaft 9 of each throttle control lever 8 may be functionally connected to a corresponding aircraft engine 26 of the aircraft such as through the onboard flight computer 2 and the reverse thrust scheduling system 24. Accordingly, the throttle control levers 8 may be selectively manipulated to a MAX forward thrust position 14 in which the aircraft engines 26 operate in a maximum forward thrust mode; an IDLE reverse thrust position 16 in which the aircraft engines 26 operate in an idle mode; and a MAX reverse thrust position 20 in which the aircraft engines 26 operate in a maximum rearward thrust mode.

As further shown in FIG. 2, the throttle control levers 8 may also be manipulated to the intermediate reverse thrust detent position 18 which may be positioned between the IDLE reverse thrust position 16 and the MAX reverse thrust position 20. A detent mechanism 19 (shown in phantom), which may be conventional, may be provided in the base 4 to "catch" or engage the lever shaft 9 of the throttle control lever 8 when the throttle control lever 8 is manipulated to the intermediate reverse thrust detent position 18.

The reverse thrust scheduling system 24 may be adapted to control the reverse thrust of the aircraft engines 26 the magnitude of which reverse thrust depends on the position of the throttle control levers 8 in the throttle quadrant 3. Accordingly, when the throttle control levers 8 are manipulated to the IDLE reverse thrust position 16 in the throttle quadrant 3, the reverse thrust scheduling system 24 may operate the aircraft engines 26 in an IDLE reverse mode. When the throttle control levers 8 are manipulated to the MAX reverse thrust position 20, the reverse thrust scheduling system 24 may operate the aircraft engines 26 in a MAX reverse thrust mode. When the throttle control levers 8 are manipulated to the intermediate reverse thrust detent position 18, the reverse thrust scheduling system 24 may operate the aircraft engines 26 in an intermediate reverse thrust mode the reverse thrust of which has a magnitude or setting that can be pre-programmed into the programmable input for reverse thrust detent position 22 prior to implementation of the intermediate reverse thrust mode of the aircraft engines 26. The reverse thrust scheduling system 24 may have the capacity to operate the aircraft engines 26 at a different reverse thrust for each available runway taxiway exit. The programmable input for reverse thrust detent position 22 may be programmable across a range of engine reverse thrust magnitudes or settings depending on the desired thrust of the aircraft engines 26.

In application, the programmable reverse thrust detent system 1 may be operated to implement a reverse thrust of the aircraft engines 26 at a magnitude or setting which is necessary to facilitate deceleration of the aircraft after landing to a reduced velocity at a pre-selected exit taxiway or other location on a landing runway. The required magnitude of reverse thrust from the aircraft engines 26 which will be necessary for the purpose after landing of the aircraft may be selected and pre-programmed into the programmable input for reverse thrust detent position 22 prior to landing of the aircraft. When the throttle control levers 8 are subsequently manipulated to the intermediate reverse thrust detent position 18 after landing of the aircraft, a position sensor signal may be transmitted from the throttle quadrant 3 to the reverse thrust scheduling system 24, which may operate the aircraft engines 26 at a reverse thrust the magnitude or setting of which was pre-programmed into the programmable input for reverse thrust detent position 22. The reverse thrust of the aircraft engines 26 may sustain deceleration of the aircraft to the desired velocity when the aircraft reaches the selected taxiway exit or other point on the landing runway. In some embodiments, the programmable input for reverse thrust detent position 22 may be programmed to facilitate asymmetric reverse thrust of the aircraft engines 26 in order to minimize yawing movement in the event that one or more of the thrust reversers of the aircraft engines 26 is inoperative.

It will be appreciated by those skilled in the art that implementation of the programmable reverse thrust detent system 1 may optimize landing performance for specific preprogrammed taxiway exits on a landing runway. Such optimization may reduce the need for MAX reverse thrust of the aircraft engines 26, allowing for more rapid engine temperature stabilization resulting in sooner engine shutdown for single-engine taxi and reduced engine wear and associated costs.

Figure 3:
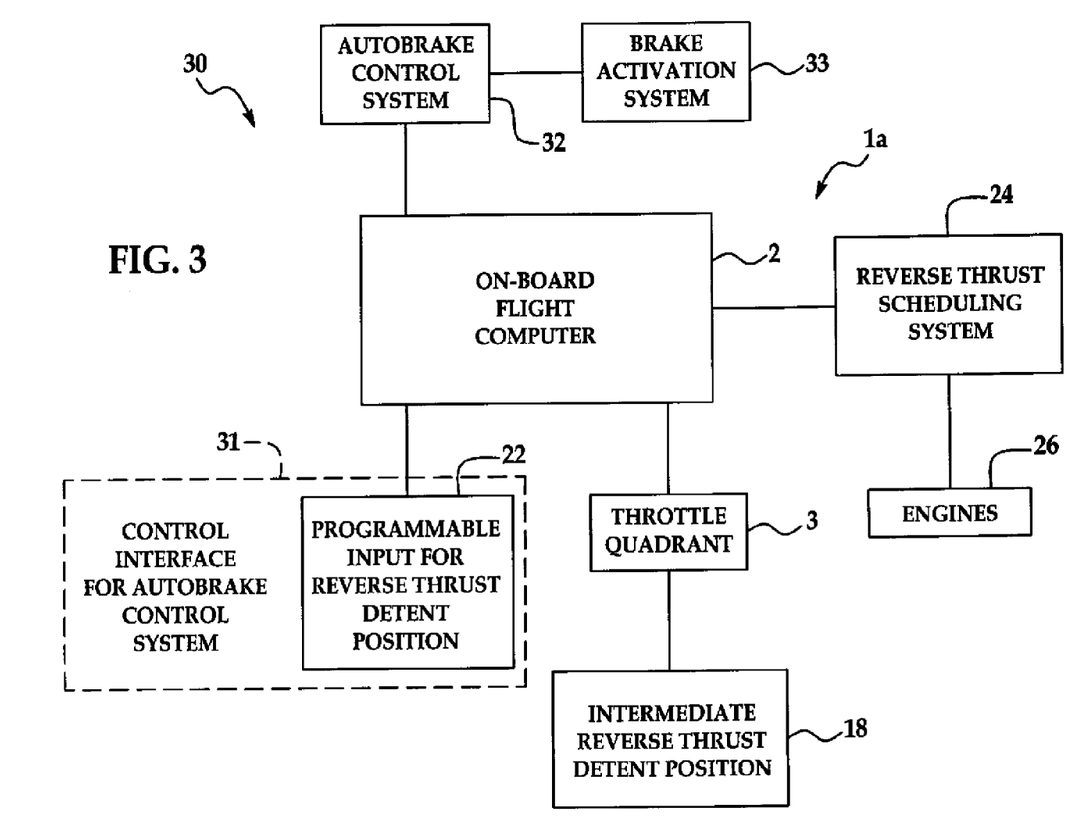
FIG. 3 is a schematic block diagram of an alternative illustrative embodiment of a reverse thrust detent system in conjunction with an autobrake system.

Referring next to FIG. 3, an alternative illustrative embodiment of the programmable reverse thrust detent system is generally indicated by reference numeral 1a. The programmable reverse thrust detent system 1a may be similar in design to the programmable reverse thrust detent system 1 heretofore described with respect to FIGS. 1 and 2, except the system 1a may be adapted for operation in conjunction with an optimum runway exiting (ORE) system such as that which is disclosed in application Ser. No. 11/777,351, for example. An autobraking system 30 of the ORE system may include an autobrake control system 32 which may interface with the onboard flight computer 2 and a brake activation system 33 which may interact with the autobrake control system 32. A control interface for autobrake control system 31 may interface with the autobrake control system 32 through the onboard flight computer 2. The programmable input for reverse thrust detent position 22 may be a part of the control interface for autobrake control system 31, as shown, or alternatively, may be a separate component.

The control interface for the autobraking control system 31 may be used to program aircraft performance parameters and landing parameters, for example and without limitation, into the onboard flight computer 2 prior to landing. The aircraft performance parameters may include parameters such as weight of the aircraft, configuration of the aircraft, information included in an airline policy file (APF) which includes information such as landing point assumption distance, runway exit target point distance, taxiway exit speed (including under braking action reporting), navigation reference point adjustment, braking performance display threshold and delayed braking threshold, for example and without limitation. The landing parameters may include parameters such as aircraft systems information and variables which can change or which can be changed by the pilot during flight. For example, the landing parameters may include a runway and an exit taxiway, defined rollout distance setting which describes a specified velocity at a selected position on a particular runway, a Land and Hold Short (LAHSO) setting, a thrust reverse setting (maximum reverse (MREV)/idle reverse (IREV)), a braking action (BA) MU setting, a minimum equipment list (MEL) setting, and a delayed braking setting. The setting or magnitude of reverse thrust from the aircraft engines 26 which will be necessary in addition to application of the autobraking system 30 to decelerate the aircraft to the selected reduced velocity at the pre-selected exit taxiway or other location after landing of the aircraft may additionally be programmed into the programmable input for reverse thrust detent position 22.

Upon landing of the aircraft, the throttle control lever 8 (FIG. 2) may be manipulated to the intermediate reverse thrust detent position 18 of the throttle quadrant 3. Simultaneously, the onboard flight computer 2 may cause the autobrake control system 32 to operate the brake activation system 33 of the aircraft according to the aircraft performance parameters and the landing parameters which were pre-programmed into the control interface for autobrake control system 31. In response, the brake activation system 33 may operate the brakes (not shown) of the aircraft in such a manner as to facilitate slowing of the aircraft on a landing runway at a deceleration rate at which the aircraft reaches one of multiple, predetermined exit taxiway (ET) which are spaced along the landing runway at a desired velocity of the aircraft. The reverse thrust scheduling system 24 may operate the aircraft engines 26 at a reverse thrust having such magnitude as to optimize the performance of the autobraking system 30. Therefore, utilization of the reverse thrust of the aircraft engines 26 in combination with the autobraking system 30 may reduce wear on the aircraft brakes as well as wear on and fuel consumption of the aircraft engines 26 during the deceleration phase of aircraft landing.

Figure 4:
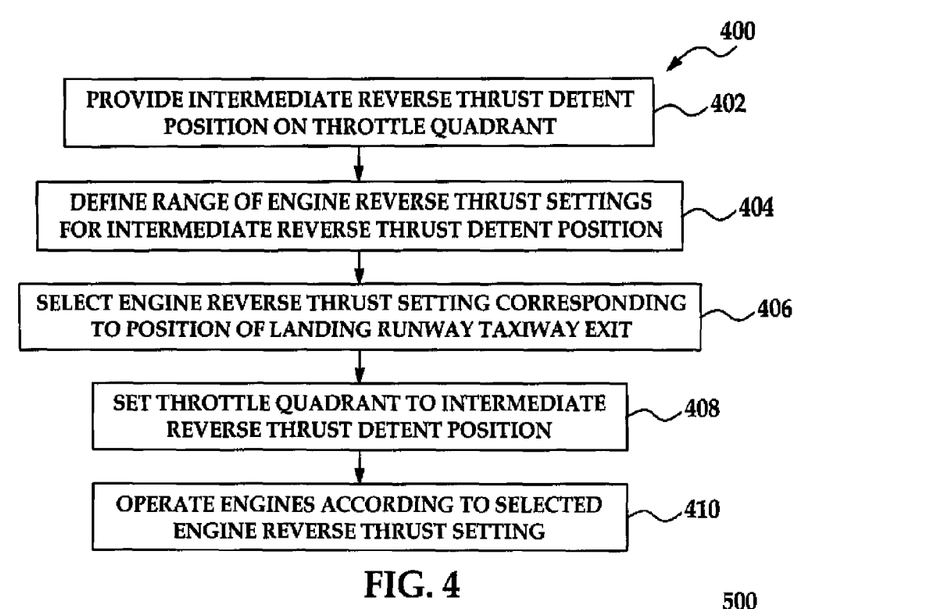
FIG. 4 is a flow diagram which illustrates an illustrative embodiment of a reverse thrust detent method.

Referring next to FIG. 4, a flow diagram 400 which illustrates an illustrative embodiment of a reverse thrust detent method is shown. In block 402, an intermediate reverse thrust detent position is provided on a throttle quadrant of an aircraft. In block 404, a range of engine reverse thrust settings for the intermediate reverse thrust detent position is defined. In block 406, an engine reverse thrust setting which corresponds to the position of a predetermined landing runway taxiway exit is selected. In block 408, the throttle quadrant is set to the intermediate reverse thrust detent position upon landing of the aircraft. In block 410, the aircraft engines may be operated according to the selected engine reverse thrust setting such that the aircraft decelerates to the predetermined landing runway taxiway exit at a selected velocity.

Figure 5:
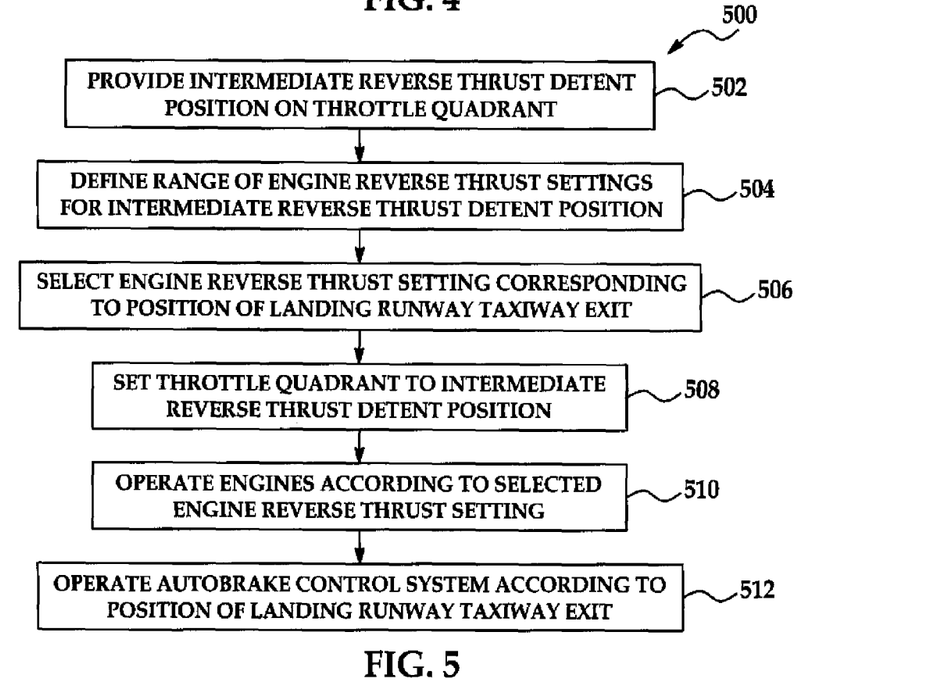
FIG. 5 is a flow diagram which illustrates an alternative illustrative embodiment of a reverse thrust detent method.

Referring next to FIG. 5, a flow diagram 500 which illustrates an illustrative embodiment of a reverse thrust detent method is shown. In block 502, an intermediate reverse thrust detent position is provided on a throttle quadrant of an aircraft. In block 504, a range of engine reverse thrust settings for the intermediate reverse thrust detent position is defined. In block 506, an engine reverse thrust setting which corresponds to the position of a predetermined landing runway taxiway exit is selected. In block 508, the throttle quadrant is set to the intermediate reverse thrust detent position upon landing of the aircraft. In block 510, the aircraft engines may be operated according to the selected engine reverse thrust setting. In block 512, an autobrake control system of the aircraft may be operated in conjunction with the reverse thrust of the aircraft engines such that the aircraft decelerates to the predetermined landing runway taxiway exit at a selected velocity.

Figure 6:
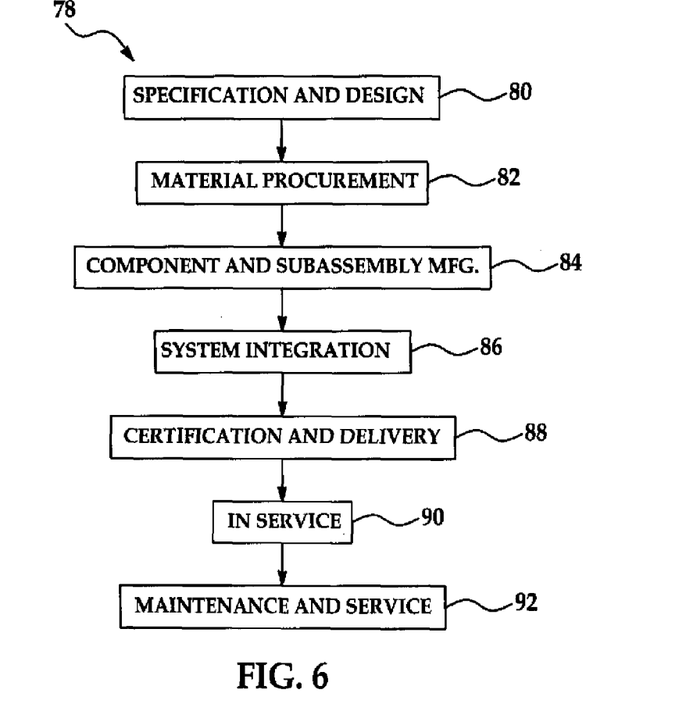
FIG. 6 is a flow diagram of an aircraft production and service methodology.
Figure 7:
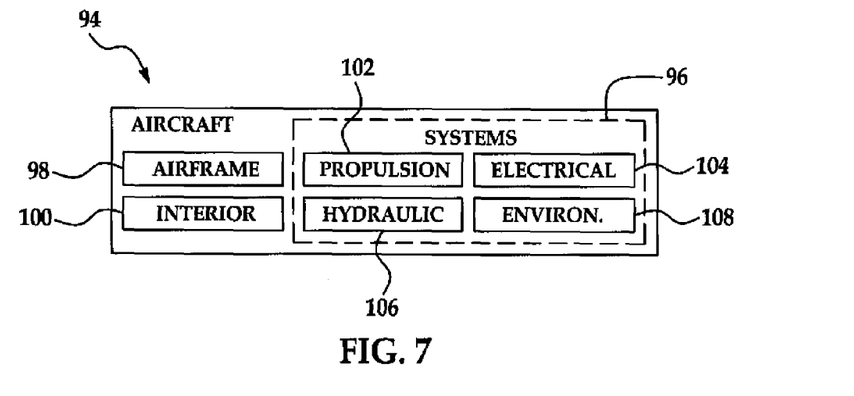
FIG. 7 is a block diagram of an aircraft.

Referring next to FIGS. 6 and 7, embodiments of the disclosure may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A reverse thrust detent system for an aircraft having aircraft performance parameters and landing parameters, comprising:
   a throttle quadrant having an adjustable detent at an intermediate reverse thrust detent position;
   a reverse thrust scheduling system interfacing with said throttle quadrant and with a brake activation system;
   at least one aircraft engine interfacing with said reverse thrust scheduling system;
   a programmable input interfacing with said reverse thrust scheduling system and adapted to receive an engine reverse thrust setting; and
   wherein said reverse thrust scheduling system is adapted to operate said at least one aircraft engine in an intermediate reverse thrust mode, the reverse thrust of which has a magnitude that is pre-programmed into the programmable input for the reverse thrust detent position based upon the aircraft performance parameters and the landing parameters, and is selected by the reverse thrust scheduling system in conjunction with operation of the brake activation system, to slow the aircraft according to a defined rollout distance setting.

2. The reverse thrust detent system of claim 1 wherein said throttle quadrant comprises a base, at least one lever slot provided in said base and at least one movable throttle control lever movable in said at least one lever slot.

3. The reverse thrust detent system of claim 2 wherein said at least one movable throttle control lever comprises at least one lever shaft movable in said at least one lever slot and a lever handle carried by said at least one lever shaft.

4. The reverse thrust detent system of claim 3 further comprising a detent mechanism provided in said base and adapted to engage said at least one lever shaft at said intermediate reverse thrust detent position.

5. The reverse thrust detent system of claim 1 wherein said throttle quadrant further comprises an IDLE reverse thrust position and a MAX reverse thrust position and wherein said intermediate reverse thrust detent position is between said IDLE reverse thrust position and said MAX reverse thrust position.

6. The reverse thrust detent system of claim 1 wherein said at least one aircraft engine comprises a plurality of aircraft engines.

7. The reverse thrust detent system of claim 6 wherein said reverse thrust scheduling system is adapted to selectively facilitate asymmetric reverse thrust of said plurality of aircraft engines.

8. The reverse thrust detent system of claim 1 further comprising an onboard flight computer and wherein said throttle quadrant, said reverse thrust scheduling system and said programmable input are connected to said onboard flight computer.

9. A reverse thrust detent system for an aircraft, comprising:
   an onboard flight computer, provided with aircraft performance parameters and landing parameters for the aircraft;
   an autobrake control system, interfacing with said onboard flight computer;
   a brake activation system interfacing with said autobrake control system;
   a control interface for said autobrake control system interfacing with said onboard flight computer;
   a throttle quadrant having an adjustable detent at an intermediate reverse thrust detent position interfacing with said onboard flight computer;
   a reverse thrust scheduling system interfacing with said throttle quadrant through said onboard flight computer;
   at least one aircraft engine interfacing with said reverse thrust scheduling system through said onboard flight computer; and
   a programmable input interfacing with said reverse thrust scheduling system through said onboard flight computer and adapted to receive an engine reverse thrust setting;
   wherein the onboard flight computer is configured to cause the autobrake control system to operate the brake activation system of the aircraft according to the aircraft performance parameters and the landing parameters, and said reverse thrust scheduling system is adapted to concurrently operate said at least one aircraft engine in an intermediate reverse thrust mode, the reverse thrust of which has a magnitude that is selected by the onboard flight computer in view of performance of the brake activation system to slow the aircraft according to a defined rollout distance setting.

10. The reverse thrust detent system of claim 9 wherein said throttle quadrant comprises a base, at least one lever slot provided in said base and at least one movable throttle control lever movable in said at least one lever slot.

11. The reverse thrust detent system of claim 10 wherein said at least one movable throttle control lever comprises at least one lever shaft movable in said at least one lever slot and a lever handle carried by said at least one lever shaft.

12. The reverse thrust detent system of claim 11 further comprising a detent mechanism provided in said base and adapted to engage said at least one lever shaft at said intermediate reverse thrust detent position.

13. The reverse thrust detent system of claim 9 wherein said throttle quadrant further comprises an IDLE reverse thrust position and a MAX reverse thrust position and wherein said intermediate reverse thrust detent position is between said IDLE reverse thrust position and said MAX reverse thrust position.

14. The reverse thrust detent system of claim 9 wherein said at least one aircraft engine comprises a plurality of aircraft engines.

15. The reverse thrust detent system of claim 14 wherein said reverse thrust scheduling system is adapted to selectively facilitate asymmetric reverse thrust of said plurality of aircraft engines.

16. A reverse thrust detent method for an aircraft having aircraft performance parameters and landing parameters and at least one aircraft engine, comprising:
providing a throttle quadrant for the aircraft;
providing an adjustable detent at an intermediate reverse thrust detent position on said throttle quadrant;
defining a range of engine reverse thrust settings for said intermediate reverse thrust detent position, said range of engine reverse thrust settings including an engine reverse thrust setting that is selectable to optimize braking performance of the aircraft based upon the aircraft performance parameters and the landing parameters, to slow the aircraft to a desired velocity at a position of a landing runway taxiway exit;
setting said throttle quadrant to said intermediate reverse thrust detent position; and
operating the at least one aircraft engine according to said engine reverse thrust setting while braking said aircraft to the desired velocity at the position of the landing runway taxiway exit.

17. The reverse thrust detent method of claim 16 further comprising providing an autobrake control system and operating said autobrake control system according to said position of said landing runway taxiway exit.

18. The reverse thrust detent method of claim 16 wherein said providing a throttle quadrant for an aircraft comprises providing a throttle quadrant comprising a base, a lever slot provided in said base, a throttle control lever movable in said slot and an IDLE reverse thrust position and a MAX reverse thrust position provided along said lever slot, and wherein said intermediate reverse thrust detent position is disposed between said IDLE reverse thrust position and said MAX reverse thrust position.

19. The reverse thrust detent method of claim 18 further comprising providing a detent mechanism in said lever slot at said reverse thrust detent position.

20. A reverse thrust detent system, comprising:
an onboard flight computer, provided with performance parameters and landing parameters for the aircraft;
an autobrake control system interfacing with said onboard flight computer;
a brake activation system interfacing with said autobrake control system;
a control interface for said autobrake control system interfacing with said onboard flight computer;
a throttle quadrant comprising:
  a base;
  at least one lever slot provided in said base;
  at least one throttle control lever having a lever shaft movable in said at least one lever slot and a lever handle carried by said lever shaft;
  a MAX forward thrust position, an IDLE reverse thrust position and a MAX reverse thrust position provided along said at least one lever slot; and
  a detent at an intermediate reverse thrust detent position provided along said at least one lever slot between said IDLE reverse thrust position and said MAX reverse thrust position and interfacing with said onboard flight computer;
a reverse thrust scheduling system interfacing with said throttle quadrant through said onboard flight computer;
at least one aircraft engine interfacing with said reverse thrust scheduling system through said onboard flight computer; and
a programmable input interfacing with said reverse thrust scheduling system through said onboard flight computer and adapted to receive an engine reverse thrust setting;
wherein the onboard flight computer is configured to cause the autobrake control system to operate the brake activation system of the aircraft according to the aircraft performance parameters and the landing parameters, and said reverse thrust scheduling system is adapted to operate said at least one aircraft engine in an intermediate reverse thrust mode, the reverse thrust of which has a magnitude that is selected by the onboard flight computer to optimize the performance of the autobrake system and is pre-programmed into the programmable input for the reverse thrust detent position to slow the aircraft according to a defined rollout distance setting.

21. A reverse thrust detent method for an aircraft having at least one aircraft engine, comprising:
providing a throttle quadrant for the aircraft comprising:
  a base;
  at least one lever slot provided in said base;
  at least one throttle control lever having a lever shaft movable in said at least one lever slot and a lever handle carried by said lever shaft;
  a MAX forward thrust position, an IDLE reverse thrust position and a MAX reverse thrust position provided along said at least one lever slot; and
  an adjustable detent at an intermediate reverse thrust detent position provided along said at least one lever slot between said IDLE reverse thrust position and said MAX reverse thrust position;
providing an autobrake control system, coupled to an onboard flight computer, provided with performance parameters and landing parameters for the aircraft;
defining a range of engine reverse thrust settings for said intermediate reverse thrust detent position, said range of engine reverse thrust settings including an engine reverse thrust setting that is selectable to optimize performance of the autobrake control system based upon the aircraft performance parameters and the landing parameters, according to a position of a landing runway taxiway exit;

positioning said at least one throttle control lever at said intermediate reverse thrust detent position of said throttle quadrant; and operating the at least one aircraft engine according to said engine reverse thrust setting and concurrently operating said autobrake control system to slow the aircraft to a desired velocity at the position of the landing runway taxiway exit.

* * * * *